United States Patent
Song et al.

(10) Patent No.: US 7,805,548 B2
(45) Date of Patent: Sep. 28, 2010

(54) METHOD, MEDIUM AND SYSTEM SETTING TRANSFER UNIT CORRESPONDING TO A MINIMUM OVERHEAD IN A DATA PROCESSING SYSTEM

(75) Inventors: Joon-ho Song, Yongin-si (KR); Si-hwa Lee, Seoul (KR); Do-hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 260 days.

(21) Appl. No.: 11/785,555

(22) Filed: Apr. 18, 2007

(65) Prior Publication Data

US 2008/0071943 A1 Mar. 20, 2008

(30) Foreign Application Priority Data

Sep. 19, 2006 (KR) ...................... 10-2006-0090793

(51) Int. Cl.
*G06F 13/00* (2006.01)
*G06F 3/00* (2006.01)
*G06F 13/28* (2006.01)

(52) U.S. Cl. ............................ 710/33; 710/23; 710/24; 710/25; 710/30; 710/34

(58) Field of Classification Search .................. 710/33, 710/23, 24, 25, 30, 33, 34
See application file for complete search history.

(56) References Cited

U.S. PATENT DOCUMENTS

2005/0220180 A1 * 10/2005 Barlev et al. ................ 375/222

* cited by examiner

*Primary Examiner*—Niketa I Patel
(74) *Attorney, Agent, or Firm*—Staas & Halsey LLP (57) ABSTRACT

A method, medium and system for setting a transfer unit in a data processing system. The method comprises setting a transfer unit in a data processing system which repeatedly performs a process of transmitting data stored in a first memory to a second memory in a predetermined transfer unit, processing the transmitted data stored in the second memory, and transmitting the processed data to the first memory. The method includes computing overhead on the data processing system according to the size of each of a plurality of data units available as the transfer unit; and setting a data unit, which corresponds to a minimum overhead from among the computed overheads, as the transfer unit. Accordingly, it is possible to set an optimum transfer unit according to an environment of a data processing system in order to improve the performance of the data processing system.

19 Claims, 3 Drawing Sheets

METHOD, MEDIUM AND SYSTEM SETTING TRANSFER UNIT CORRESPONDING TO A MINIMUM OVERHEAD IN A DATA PROCESSING SYSTEM

CROSS-REFERENCE TO RELATED APPLICATIONS

This application claims the priority of Korean Patent Application No. 10-2006-0090793, filed on Sep. 19, 2006, in the Korean Intellectual Property Office, the disclosure of which is incorporated herein in its entirety by reference.

BACKGROUND

1. Field

One or more embodiments of the present invention relate to a method, medium and system for setting a transfer unit in a data processing system, and more particularly, to a method, medium and system setting a transfer unit in order to minimize the overhead of processing data in a data processing system that processes data by repeatedly transmitting data stored in a low-speed operating memory to a high-speed operating memory so that the data can be processed by the high-speed operating memory, and transmitting the result of the processing to the low-speed operating memory.

2. Description of the Related Art

In general, a large-capacity memory is indispensable for encoding or decoding a large amount of data, such as video data. Typically, a large-capacity memory operates at low speed since it has high density and a long access time, and a low-capacity memory operates at high speed since it has low density and a short access time. Since the operating speed of a large-capacity memory is significantly lower than that of a central processing unit that processes data (hereinafter referred to as a "CPU"), the performance of a data processing system that processes data using a large-capacity memory is degraded mainly by the low-speed operating characteristics of the large-capacity memory. In order to solve this problem, a general digital signal processor system capable of encoding/decoding video data (hereinafter referred to as a "DSP system") uses a cache memory, and performs most operations at high speed, like that of a CPU, using a low-capacity memory, such as a static random access memory (SRAM), and transmits the result of performing the operations to a large-capacity memory, such as a dynamic random access memory (DRAM) or a synchronous DRAM (SDRAM).

Memory access parameters for controlling the operation of memory must be set in order to allow a CPU to fetch data from a large-capacity memory and transfer it to a cache memory. The memory access parameters are values set by the CPU in order to control data to be input to or output from a memory, and the memory operates according to the set memory access parameters. In order to minimize the overhead on the CPU when controlling data input/output (I/O) operations, it is possible to control data to be input to or output from the memory according to direct memory access (hereinafter referred to as "DMA"). DMA is a process for directly transmitting data between I/O devices or memories without using a CPU. While the CPU generally does not use a bus in the system, a DMA controller is given the right to use the bus from the CPU, set memory access parameters for controlling memory, and directly control data to be input to or output from a plurality of memories.

However, the CPU must set DMA parameters for driving the DMA controller in order to operate the DMA controller. Since the DMA parameters must be set whenever the DMA controller operates, the DMA parameters must be set whenever the DMA controller accesses a memory to fetch data from the memory, so as to transfer the data to another memory. Also, if the memory access parameters are set whenever the DMA controller accesses a memory, so as to fetch data from the memory, a SDRAM must set memory access parameters whenever rows in the memory change. Thus, use of a memory with small row sizes increases the overhead on the data processing system when data I/O operations are performed.

Accordingly, when data is transmitted in a small transfer unit, such as a macro block, the number of times that the data is transmitted increases in order to process the entire data. Here, the number of times the DMA parameters are set also increases, thus increasing the number of times memory access parameters are set so as to fetch data from a memory, such as SDRAM. Therefore, the overhead on the CPU when performing data I/O operations increases in proportion to the amount of time required to perform processes of transmitting data.

In order to solve this problem, data can be transmitted and processed in a transfer unit greater than a macro block. For example, macro blocks in a frame are transmitted in row units. When eight macro blocks form a row, data transmission is performed 8 times in order to process a frame consisting of 8×8 macro blocks, thereby reducing the number of times DMA parameters and memory access parameters are set. When transfer units are increased for data processing, the amount of setting time for data transmission is reduced, thus reducing the overhead on the data processing system when performing data I/O operations. However, in this case, the amount of data to be transmitted and processed at a time is increased, and a delay time required to perform a process of transmitting data, process the transmitted data, and transmit the processed data is increased.

SUMMARY

One or more embodiments of the present invention provide a method and system for optimally setting a transfer unit according to an environment of a data processing system so as to minimize the overhead on the data processing system, thereby improving the performance of the data processing system; and a recording medium having recorded thereon a program for executing the method.

One or more embodiments of the present invention also provide a method and system for processing data, which are capable of optimally setting a transfer unit according to an environment of a data processing system so as to minimize the overhead on the data processing system, and capable of processing data in the set transfer units, thereby improving the performance of the data processing system, and a recording medium having recorded thereon a program for executing the method.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method of setting a transfer unit in a data processing system which repeatedly performs a process of transmitting data stored in a first memory to a second memory in a predetermined transfer unit, processing the transmitted data stored in the second memory, and transmitting the processed data to the first memory. The method includes computing overhead on the data processing system according to a size of each of a plurality of data units available as the transfer unit, and setting a data unit, which corresponds to a minimum overhead from among the computed overheads, as the transfer unit.

To achieve at least the above and/or other aspects and advantages, embodiments of the present invention include a method of processing data by repeatedly performing a process of transmitting data stored in a first memory to a second memory in a predetermined transfer unit, processing the transmitted data stored in the second memory, and transmitting the processed data to the first memory. The method includes computing overhead on the data processing system according to a size of each of a plurality of data units available as the transfer unit, setting a data unit, which corresponds to a minimum overhead from among the computed overheads, as the transfer unit, and processing the data in the set transfer unit.

To achieve at least the above and/or other aspects and advantages, embodiments of the present invention include a system for setting a transfer unit in a data processing system which repeatedly performs a process of transmitting data stored in a first memory to a second memory in a predetermined transfer unit, processing the transmitted data stored in the second memory, and transmitting the processed data to the first memory. The system includes an overhead computing unit to compute overhead on the data processing system according to a size of each of a plurality of data units available as the transfer unit, and a transfer unit setting unit to set a data unit, which corresponds to a minimum overhead from among the computed overheads, as the transfer unit.

To achieve at least the above and/or other aspects and advantages, embodiments of the present invention include a data processing system which repeatedly performs a process of transmitting data stored in a first memory to a second memory in a predetermined transfer unit, processing the transmitted data stored in the second memory, and transmitting the processed data to the first memory. The system includes an overhead computing unit to compute overhead on the data processing system according to a size of each of a plurality of data units available as the transfer unit, a transfer unit setting unit to set a data unit, which corresponds to a minimum overhead from among the computed overheads, as the transfer unit, and a processor to process the data in the set transfer unit.

To achieve at least the above and/or other aspects and advantages, embodiments of the present invention include a method of setting a transfer unit in a data processing system. The method includes computing a delay time and a total setting time associated with each of a plurality of selected data unit sizes, calculating a required overhead corresponding to each data unit size by summing the delay time and the total setting time for each data unit size, and setting a data unit size, corresponding to a minimum required overhead based on the calculated required overheads, as the transfer unit.

To achieve at least the above and/or other aspects and advantages, embodiments of the present invention include a computer readable medium having recorded thereon a computer program for executing a method of setting a transfer unit or a method of processing data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

First, a data processing system, which may benefit from a method and system setting a transfer unit for data processing, according to an embodiment of the present invention, will be described.

When a large-capacity memory is used to process a large amount of data, the performance of a data processing system may be significantly degraded because the operating speed of the large-capacity memory may be slower than that of a CPU that processes the data. Thus, most operations may be performed using a memory capable of operating at high speed like that of a CPU, and the result of performing the operations may be transmitted to a large-capacity memory. In general, a large-capacity memory may have high density but operate at slow speed, while a low-capacity memory may have low density but operate at high speed. For this reason, when data stored in a large-capacity memory is transmitted to and processed by a high-speed operating memory in order to increase the data processing speed, the data may be transmitted to and processed by the high-speed operating memory in transfer units and the processed data may be transmitted to a large-capacity memory, since it may be difficult or impossible to transmit and process the entire data stored in the large-capacity memory at one time.

Figure 1:
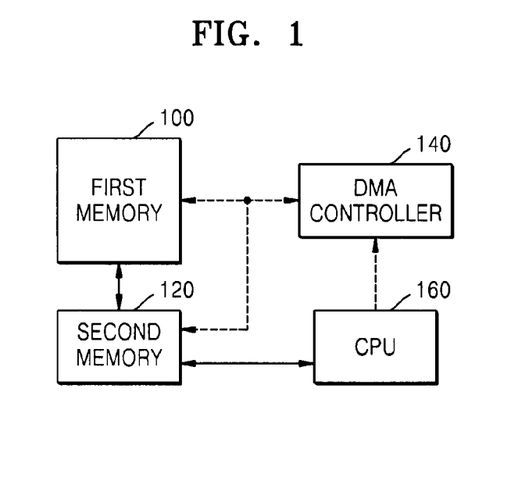
FIG. 1 illustrates a data processing system, according to an embodiment of the present invention.

FIG. 1 illustrates an example of a data processing system to which an embodiment of the present invention may be applicable. The data processing system may include, for example, a first memory 100, a second memory 120, a direct memory access (DMA) controller 140, and a central processing unit (CPU) 160. The data processing system may be, for example, a video encoding/decoding system, or an image processing system. It may be assumed herein that the data processing system is a video encoding/decoding system for convenience of explanation.

The first memory 100 may store video data. In order to store a large amount of data, such as video data, the first memory 100 may be embodied as a dynamic random access memory (DRAM) or a synchronous DRAM (SDRAM), each potentially having large storage capacity. In some cases, the first memory 100 may be embodied as a hard disk, a compact disk (CD), or a digital versatile disc (DVD), for example.

Since the operating speed of a large-capacity memory, such as a DRAM, is generally slower than that of the CPU 160, the operating speed of the video encoding/decoding system may be significantly degraded when the CPU 160 directly accesses the first memory 100 to encode/decode video data. Thus, in order to improve the operating speed of the video encoding/decoding system, video data stored in the first memory 100 may be transmitted to and stored in the second memory 120 that operates at high speed, and then, the CPU 160 may process the video data stored in the second memory 120. In general, since a high-speed operating memory may have a low storage capacity, it may not be capable of transmitting the entire video data stored in the first memory 100 to the second memory 120 in order to store it in the second memory 120 and processing the video data stored in the second memory 120 simultaneously. Thus, the video data stored in the first memory 100 may be transmitted to the second memory 120 in transfer units so as to store and process the video data in the second memory 120. In this case, the transfer unit may be set to a bundle of at least one macro block. A macro block is a basic unit consisting of 16×16 pixels in which video data may be processed.

The second memory 120 may receive and temporarily store the video data stored in first memory 100. The second memory 120 is typically a memory that the CPU 160 accesses to process data, and is thus generally embodied as a static random memory (SRM) capable of operating at high speed, such as the CPU 160.

The DMA controller 140 may fetch the video data from the first memory 100 to the second memory 120 in order to store the video data in the second memory 120, for example. Although data input/output (I/O) operations in a memory should be controlled by the CPU 160, the DMA controller 140 may control the data I/O operations in a memory according to DMA in order to minimize the overhead on the CPU 160 when controlling the data I/O operations. DMA is a process of directly transmitting between 1/O devices or memories without using a CPU.

While the CPU 160 may not use a bus in the system, the DMA controller 140 may be given the right to use the bus from the CPU so as to allow data to be directly exchanged between memories, and may set memory access parameters for accessing the first and second memories 100 and 120. The memory access parameters set by the DMA controller 140 may allow the operations of the first and second memories 100 and 120 to be controlled so that the video data stored in the first memory 100 may be transmitted to and stored in the second memory 120. If the first memory 100 is an SDRAM, the DMA controller 140 typically must newly set memory access parameters whenever rows in the first memory 100 change. Also, the CPU 160 typically must set DMA parameters in order to drive the DMA controller 140. Since the DMA controller 140 typically must be driven whenever video data is transmitted, the CPU 160 typically must set DMA parameters whenever video data is transmitted.

The CPU 160 may encode the video data stored in the second memory 120 and transmit the encoded video data to the first memory 100. Also, the CPU 160 may set DMA parameters for driving the DMA controller 140. A video encoding/decoding operation may be performed by carrying out a large number of operations, and thus, the data processing speed may be very slow when data is read directly from a memory, such as the first memory 100, which may operate at low speed. Thus, in the data processing system, the video data stored in the first memory 100 may be transmitted to the second memory 120 in a macro block or in macro blocks, and the CPU 160 may process the video data stored in the second memory 120, whose operating speed is faster than that of the first memory 100, and transmit the processed data to the first memory 100, thereby increasing the data processing speed. In an embodiment of the present invention, the CPU 160 may be embodied as any type of microprocessor.

Figure 2:
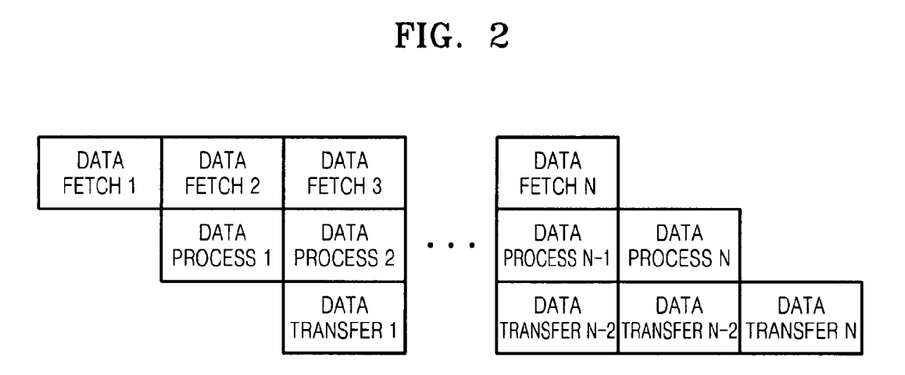
FIG. 2 illustrates a data processing method of a data processing system, according to an embodiment of the present invention.

FIG. 2 illustrates a data processing method of a data processing system, according to an embodiment of the present invention. As described above, generally, in order to improve data processing speed, a process of transmitting data stored in the first memory 100, which operates at low speed, to the second memory 120, which operates at high speed, processing the transmitted data using the CPU 160, and transmitting the processed data to the first memory 100, may be repeatedly performed until transmission of the entire data is completed. Here, a transfer unit may refer to the size of the data piece in which the data stored in the first memory 100 is transmitted to the second memory 120 at a single time.

A method of encoding/decoding video data will now be described with reference to FIGS. 1 and 2.

In a first operation, first data, that is, a first piece of video data that is divided into transfer units, may be transmitted from the first memory 100 to the second memory 120 (Data Fetch 1). In a second operation, second data, that is, a piece of data subsequent to the first data, may be transmitted from the first memory 100 to the second memory 120 (Data Fetch 2), and the first data may be encoded/decoded at the same time (Data Process 1). In a third operation, third data may be transmitted from the first memory 100 to the second memory 120 (Data Fetch 3), and at the same time, the second data may be encoded/decoded (Data Process 2) and the first data encoded or decoded in the second operation may be transmitted to the first memory 100 (Data Transfer 1).

In an $N^{th}$ operation, $N^{th}$ data, that is, a last piece of the video data may be transmitted from the first memory 100 to the second memory 120 (Data Fetch N), and at the same time, $N-1^{st}$ data may be encoded/decoded (Data Process N-1) and $N-2^{nd}$ data may be transmitted to the first memory 100 (Data Transfer N-2). In an $N+1^{st}$ operation, the $N^{th}$ data may be encoded/decoded (Data Process N), and at the same time, the $N-1^{st}$ data may be transmitted to the first memory 100 (Data Transfer N-1). In an N+2 operation, the $N^{th}$ data may be transmitted to and stored in the first memory 100 (Data Transfer N).

As described above, a data processing system, according to an embodiment of the present invention may perform a process of transmitting data stored in the first memory 100 to the second memory 120, processing the transmitted data stored in the second memory 120, and transmitting the processed data to the first memory 100, according to a pipeline method. Also, the data processing system may repeatedly perform this process on first and second data so as to encode/decode the entire video data stored in the first memory 100. Here, the time required to transmit the data stored in the first memory 100 to the second memory 120 in transfer units (Data Fetch), process the data stored in the second memory 120 (Data Process), and transmit the processed data to the first memory 100 (Data Transfer), may be referred to as "delay time".

If data is processed according to the pipeline method, an increase in the size of a transfer unit in which the data is transmitted may result in an increase in the amount of data that may be transmitted and processed at a given time. Therefore, the time that the CPU 160 requires to process the transmitted data may increase, and thus the delay time may increase. However, when the size of a transfer unit is reduced in order to reduce the delay time, the number of times that the data is transmitted in order to process the entire data may be increased as described above. Thus, the number of times that DMA parameters and memory access parameters are set for data transmission may be increased accordingly. Therefore, a reduction in the size of a transfer unit may result in an increase in the overhead on the data processing system when the data is transmitted, thereby degrading the performance of the data processing system.

An embodiment of the present invention is applicable to not only a data processing system that controls the transmission of data to a memory according to DMA, but also a data processing system in which the CPU 160 may control the transmission of data to a memory. In the latter case, a data processing system, to which an embodiment of the present invention is applied, may not include the DMA controller 140 illustrated in FIG. 1; but instead, the CPU 160 may control the transmission of data to a memory. Furthermore, a method, medium and system for setting a transfer unit, according to an embodiment of the present invention, may be applicable to various types of data processing systems that may be easily derived by those of ordinary skill in the art, as falling within the spirit and scope of the present invention.

Thus, according to a method, medium and system for setting a transfer unit, according to an embodiment of the present invention, it may be possible to optimally set a transfer unit in consideration of a delay time and a setting time for data transmission that may vary depending on an environment of a data processing system (the amount of data, memory performance, and the CPU operating speed, etc.), thereby minimizing the overhead on the data processing system.

A method, medium and system for setting a transfer unit according to embodiments of the present invention will now be described in greater detail with reference to FIGS. 3 and 4.

Figure 3:
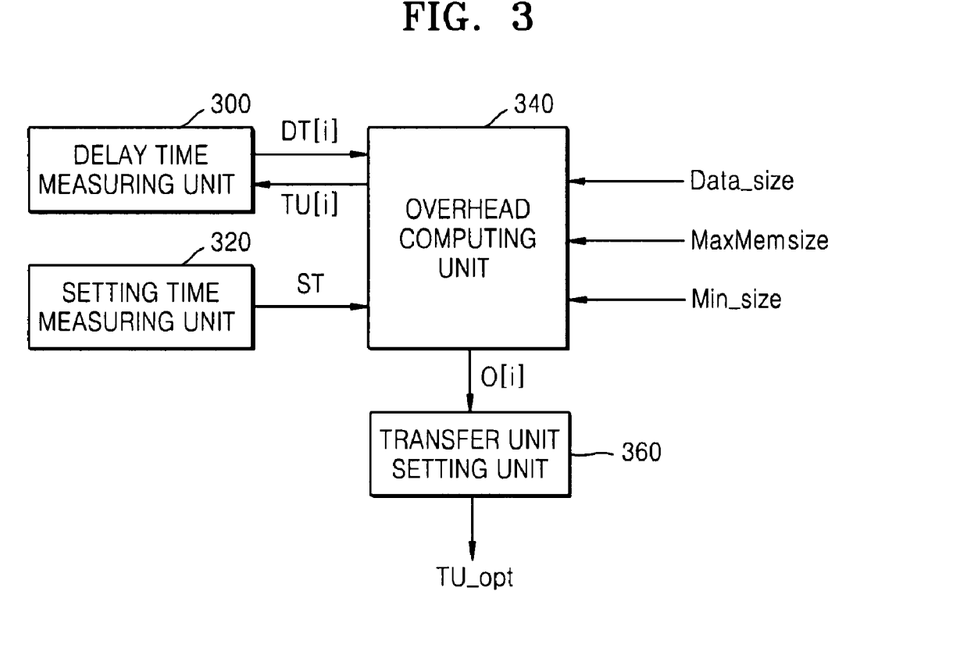
FIG. 3 illustrates for a system setting a transfer unit, according to an embodiment of the present invention.
Figure 4:
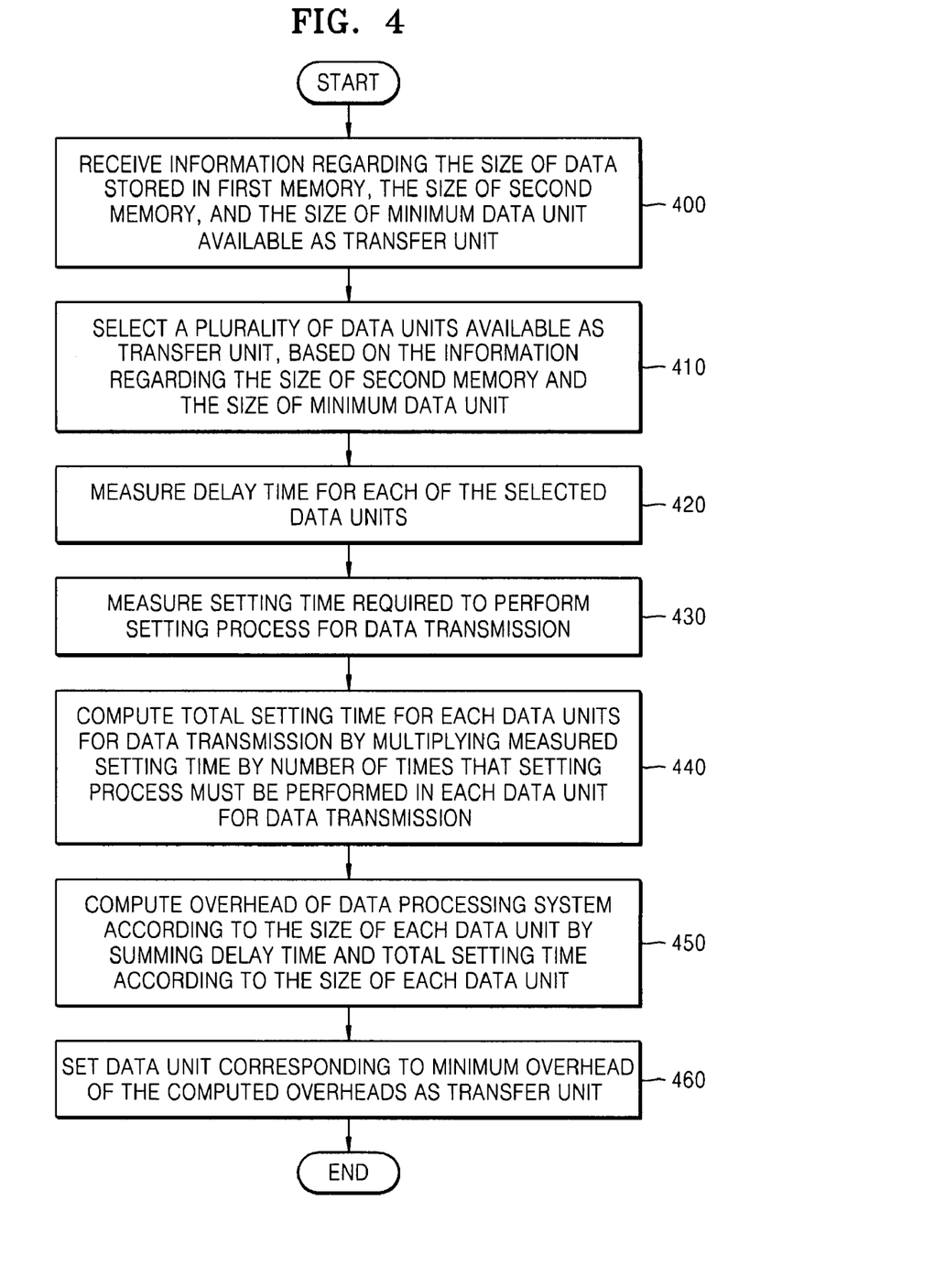
FIG. 4 illustrates a method setting a transfer unit, according to an embodiment of the present invention.

FIG. 3 illustrates a system setting a transfer unit, according to an embodiment of the present invention. The system may include, for example, a delay time measuring unit 300, a setting time measuring unit 320, an overhead computing unit 340, and a transfer unit setting unit 360.

The delay time measuring unit 300 may measure a delay time for each of a plurality of various data units that are available as a transfer unit in a data processing system. As described above, the delay time for each of the various data units may indicate the amount of time required to transmit data stored in the first memory 100 of FIG. 1 to the second memory 120 in each data unit, process the transmitted data stored in the second memory 120, and transmit the processed data to the first memory 100.

In an embodiment of the present invention, the size of each various data unit available as a transfer unit may be a multiple of the size of a minimum data unit that may be set as a transfer unit. For example, if the data stored in the first memory 100 is video data, a minimum data unit available as a transfer unit is typically a macro block. Here, the size TU[i] of each of a plurality of data units may correspond to that of more than one macro block (i is an integer and $1 \leq i \leq N$, and N indicates the number of the data units). The size TU[i] of each data unit may be expressed by:

$$TU[i] = i \times Min\_size \qquad \text{Equation 1}$$

(i is an integer and $1 \leq i \leq M$, and M denotes the number of various data units available as a transfer unit).

Wherein Min_size denotes the size of a minimum data unit available as a transfer unit. If the data is video data, the minimum data unit may typically corresponds to a macro block. In this case, the size TU[M]=M×Min_size of the maximum data unit of the various data units is preferably less than the size MaxMemSize of the second memory 120. This is because when the video data stored in the first memory 100 is transmitted to the second memory 120 in a transfer unit whose size is greater than the size MaxMemSize of the second memory 120, a part of the transmitted data may be lost without being stored in the second memory 120.

The delay time measuring unit 300 may inform the overhead computing unit 340 of a delay time DT[i] according to the size TU[i] of each of the measured data units.

The setting time measuring unit 320 may measure a setting time ST for data transmission, and inform the overhead computing unit 340 of the measured setting time ST. Here, the setting time ST for data transmission may be a sum of the amount of time required to set DMA parameters for driving the DMA controller 140 and the amount of time required for the DMA controller 140 to set memory access parameters for the first memory 100 and the second memory 120. The DMA parameters and the memory access parameters typically must be set whenever data is divided into and transmitted in transfer units, and thus, the setting time ST, for data transmission, which is measured by the setting time measuring unit 320 may mean a setting time ST incurred whenever data is transmitted.

The overhead computing unit 340 may be informed of the delay time DT[i], for each data unit, as measured by the delay time measuring unit 300, and of the setting time ST required to perform a setting process for data transmission once, as measured by the setting time measuring unit 320. Also, the overhead computing unit 340 may receive information regarding the size Data_size of the data stored in the first memory 100, the size MaxMemSize of the second memory 120, and the size Min_size of a minimum data unit of a plurality of data units that may be set as a transfer unit according to the type of data stored in the first memory 100. However, in another embodiment of the present invention, the size MaxMemSize of the second memory 120 or the size Min_size of the minimum data unit of the above information may have been previously stored in the overhead computing unit 340.

The overhead computing unit 340 may compute the overhead O[i] for each data unit by summing the delay time DT[i] and a total setting time ST_total[i] for each data unit. The total setting time ST_total[i] required to encode the entire video data may be computed by multiplying a total number of times N that data is transmitted in order to process the entire data, by the setting time ST that is required to perform the setting process once for data transmission, measured by the setting time measuring unit 320. The total number of times N may be equal to a total number of times that the setting process is performed for data transmission, and thus may be computed by dividing the size Data_size of the entire data by the size TU[i] of each of the data units available as a transfer unit, as follows:

$$O[i] = DT[i] + ST\_total[i],$$

$$ST\_total[i] = ST \times N,$$

$$N = Data\_size / TU[i] \qquad \text{Equation 2}$$

(i is an integer and $1 \leq i \leq M$, and M denotes the number of a plurality of data units that can be set as a transfer unit).

Wherein TU[i] denotes the size of an ith data unit of a plurality of data units that may be set to a transfer unit, O[i] denotes the overhead when data is transmitted in the ith data unit, TU[i] denotes a delay time incurred when data is transmitted in the ith data unit, ST denotes a setting time incurred when the setting process is performed once for data transmission, and Data_size denotes the size of video data to be processed.

The overhead computing unit 340 may compute the total number of times N that data is transmitted in each data unit (the total number of times N that the setting process is performed for data transmission) by dividing the size Data_size of the received video data by the size TU[i] of each data unit. Then, the overhead computing unit 340 may compute the total setting time ST_total[i], required to perform the setting process for data transmission in order to encode the entire video data, by multiplying the setting time ST required to perform the setting process once for data transmission by the total number of times N that data is transmitted. Next, the overhead computing unit 340 may compute the overhead O[i] when the data is processed in each data unit by summing the delay time DT[i] according to the size TU[i] of each data unit and the total setting time ST_total[i] for each data unit, and may inform the transfer unit setting unit 360 of the computed overhead for each data unit.

In an embodiment of the present invention, the overhead computing unit 340 may receive information regarding the size MaxMemSize of the second memory 120, the size Data_size of the entire data, and the size Min_size of a minimum data unit of a plurality of data units available as a transfer unit, from a data processing system (not shown); select the data units available as a transfer unit for data processing, based on the received information; and provide the delay time measuring unit 300 with the sizes TU[i] of each selected data unit (i is an integer and $0 \leq i \leq M$, and M denotes the number of the data units available as a transfer unit). Then, the delay time measuring unit 300 may measure a delay time for the provided size TU[i] of each data unit, and provide the measured delay times to the overhead computing unit 340. Here, the overhead computing unit 340 may provide the delay time measuring unit 300 with the sizes TU[i] of the selected data units at a time, and may receive the delay times for the sizes TU[i] of the selected data units, which were measured by the delay time measuring unit 300, at a time. Otherwise, the overhead computing unit 340 may provide the delay time measuring unit 300 with the size of one of the data units, provide the delay time measuring unit 300 with the size of any one of the other data units when receiving a delay time for the provided size of the data unit measured by the delay time measuring unit 300, and may repeat this process until the delay times for all the data units are received. In addition, a delay time according to the size of each data unit may be measured and the overhead according to the size of each of the data units may be computed using various methods that may be easily derived by those of ordinary skill in the art.

The transfer unit setting unit 360 may set a data unit, which corresponds to a minimum overhead of the overheads computed by the overhead computing unit 340, to a transfer unit in the data processing system, and provide the set transfer unit to the data processing system.

Accordingly, since the data processing system may be capable of processing the data in the set transfer unit, the overhead on the data processing system may be minimized, thereby improving the performance and efficiency of the data processing system.

A method of setting a transfer unit for data processing according to an embodiment of the present invention will now be described with reference to FIGS. 3 and 4. In operation 400, information regarding the size Data_size of data stored in the first memory 100, the size MaxMemSize of the second memory 120, and the size Min_size of a minimum data unit of a plurality of data units available as a transfer unit may be received, e.g., by the transfer unit setting unit 360. If the data stored in the first memory 100 is video data, the size Min_size of the minimum data unit may typically correspond to the size of a macro block. According to another embodiment of the present invention, the size Min_size of the minimum data unit may be predetermined. In this case, information regarding the size Min_size of the minimum data unit need not be received, e.g., by the transfer unit setting unit 360.

In operation 410, a plurality of data units available as a transfer unit may be selected based on the information regarding the size MaxMemSize of the second memory 120 and the size Min_size of the minimum data unit, e.g., by the transfer unit setting unit 360. For example, if the size Min_size of the minimum data unit corresponds to the size of a macro block, the size TU[i] of each data unit may be determined so as to correspond to the size TU[i]=i×Min_size of more than one macro block (i is an integer and $0 \leq i \leq M$, and M denotes the number of the data units available as a transfer unit).

In operation 420, a delay time DT[i] for each selected data unit may be measured, e.g. by the transfer unit setting unit 360.

In operation 430, a setting time ST needed to perform a setting process for data transmission may be measured, e.g., by the transfer unit setting unit 360. When transmission of data to a memory is controlled according to DMA, the setting time ST may mean the amount of time required to set DMA parameters and memory access parameters.

In operation 440, a total setting time ST_total[i] for each of the data units for data transmission may be computed, e.g., by the transfer unit setting unit 360, by multiplying the measured setting time ST by the number of times N that the setting process must be performed in each data unit for data transmission. The total setting time ST_total[i] may mean a total amount of time needed to perform the setting process for data transmission in order to process the entire data. Here, the number of times N may be computed by dividing the size Data_size of the entire data by the size TU[i] of each data unit.

In operation 450, the overhead O[i] on the data processing system may be computed, e.g., by the transfer unit setting unit 360, according to the size of each data unit by summing the delay time DT[i] and the total setting time ST_total[i] according to the size of each data unit.

In operation 460, a data unit may be set, e.g., by the transfer unit setting unit 360, which corresponds to a minimum overhead from among the computed overheads, to a transfer unit, and provides the set transfer unit to the data processing system.

As described above, according to a method, medium and system for setting a transfer unit according to an embodiment of the present invention, information regarding a possible minimum size of a transfer unit according to the size and type of data, and the size of a memory included in a data processing system may be received; a delay time, and a setting time required to perform a setting process for data transmission according to an environment of the data processing system may be measured; and an optimum transfer unit may be set so that the overhead on the data processing system may be minimized, based on the received information and the measured times. Accordingly, it is possible to set an optimum transfer unit according to the environment of the data processing system.

According to the method, medium and system processing data according to an embodiment of the present invention, data is processed in an optimum transfer unit, which is set using a method, medium and system setting a transfer unit according to the present invention so as to minimize the overhead on a data processing system, thereby improving the performance of the data processing system.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

In a method and system setting a transfer unit and a recording medium having recorded thereon the method according to the present invention, the overhead on a data processing system may be computed using a delay time in the data processing system and a setting time required for data transmission, and an optimum transfer unit may be set in order to minimize the overhead, thereby improving the performance of the data processing system according to an environment of the data processing system.

Also, in a method and system setting a transfer unit and a recording medium having recorded thereon the method according to the present invention, data may be processed in an optimum data unit that may be set in order to minimize the overhead on a data processing system according to an environment of the data processing system, thereby improving the performance of the data processing system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of setting a transfer unit in a data processing system which repeatedly performs a series of processes of transmitting data stored in a first memory to a second memory in the transfer unit, processing the transmitted data stored in the second memory, and transmitting the processed data to the first memory, the method comprising:
   computing overheads on the data processing system according to a size of each of a plurality of data units available as the transfer unit respectively; and
   setting the transfer unit as a data unit size which corresponds to a minimum overhead from among the computed overheads,
   wherein the overhead is computed by summing a delay time required to perform the series of processes and a total setting time required to perform a setting process in order to transmit the data between the first memory and the second memory.

2. The method of claim 1, wherein the computing overhead comprises:
   measuring the delay time required to perform the series of processes for each data unit and a setting time required to perform the setting process once;
   computing the total setting time for each data unit by multiplying the measured setting time by a total number of times that the setting process is to be performed in order to process an entire data in each data unit; and
   computing the overhead for each of the data units by summing the measured delay time for each data unit and the computed total setting time.

3. The method of claim 1, wherein sizes of the data units are less than a size of the second memory.

4. The method of claim 1, wherein, when the data is transmitted using a direct memory access (DMA) device, the setting process comprises:
   setting DMA parameters for driving the DMA device; and
   setting memory access parameters for driving the first memory.

5. The method of claim 1, wherein the data processing system performs the process of transmitting data stored in the first memory to the second memory, processing the transmitted data stored in the second memory, and transmitting the processed data to the first memory, according to a pipeline method.

6. The method of claim 1, wherein an operating speed of the second memory is higher than an operating speed of the first memory.

7. The method of claim 1, wherein the data processing system encodes the data or decodes the data.

8. The method of claim 7, wherein, when the data is video data, the size of each of the data units is a multiple of the size of a macro block.

9. A method of processing data by repeatedly performing a series of processes of transmitting data stored in a first memory to a second memory in the transfer unit, processing the transmitted data stored in the second memory, and transmitting the processed data to the first memory, the method comprising:
   computing overheads on the data processing system according to a size of each of a plurality of data units available as the transfer unit respectively;
   setting the transfer unit as a data unit size which corresponds to a minimum overhead from among the computed overheads; and
   processing the data in the set transfer unit,
   wherein the overhead is computed by summing delay time required to perform the series of processes and a total setting time required to perform a setting process in order to transmit the data between the first memory and the second memory.

10. A system for setting a transfer unit in a data processing system which repeatedly performs a series of processes of transmitting data stored in a first memory to a second memory in the transfer unit, processing the transmitted data stored in the second memory, and transmitting the processed data to the first memory, the system comprising:
    an overhead computing unit to compute overhead on the data processing system according to a size of each of a plurality of data units available as the transfer unit respectively; and
    a transfer unit setting unit to set the transfer unit as a data unit size which corresponds to a minimum overhead from among the computed overheads,
    wherein the overhead is computed by combining a delay time required to perform the series of processes and a total setting time required to perform a setting process in order to transmit the data between the first memory and the second memory.

11. The system of claim 10, wherein a total setting time for each data unit is computed by multiplying a setting time that is required to perform the setting process once by a number of times that the setting process is to be performed in order to process an entire data in each data unit.

12. The system of claim 10, further comprising:
    a delay time measuring unit to measure the delay time for each data unit; and
    a setting time measuring unit to measure a setting time.

13. The system of claim 10, wherein a size of each data unit is less than a size of the second memory.

14. The system of claim 10, wherein, when the data is transmitted using a direct memory access (DMA) device, the setting process comprises:

setting DMA parameters for driving the DMA device; and setting memory access parameters for driving the first memory.

15. The system of claim 10, wherein the data processing system performs the process of transmitting data stored in the first memory to the second memory, processing the transmitted data stored in the second memory, and transmitting the processed data to the first memory, according to a pipeline method.

16. The system of claim 10, wherein the data processing system encodes the data or decodes the data.

17. A data processing system which repeatedly performs a series of processes of transmitting data stored in a first memory to a second memory in the transfer unit, processing the transmitted data stored in the second memory, and transmitting the processed data to the first memory, the system comprising:

an overhead computing unit to compute overheads on the data processing system according to a size of each of a plurality of data units available as the transfer unit, respectively;

a transfer unit setting unit to set the transfer unit as a data unit size which corresponds to a minimum overhead from among the computed overheads; and a processor to process the data in the set transfer unit, wherein the overhead is computed by combining a delay time required to perform the series of processes and a total setting time required to perform a setting process in order to transmit the data between the first memory and the second memory.

18. At least one medium comprising computer readable code to control at least one processing element to implement the method of any one of claim 1 or 2 through 9.

19. A method of setting a transfer unit in a data processing system, the method comprising:

computing a delay time and a total setting time associated with each of a plurality of selected data unit sizes;

calculating required overheads corresponding to each data unit size by summing the delay time and the total setting time for each data unit size; and setting the transfer unit as a data unit size corresponding to a minimum required overhead based on the calculated required overheads.

* * * * *

UNITED STATES PATENT AND TRADEMARK OFFICE
CERTIFICATE OF CORRECTION

PATENT NO. : 7,805,548 B2  Page 1 of 1
APPLICATION NO. : 11/785555
DATED : September 28, 2010
INVENTOR(S) : Joon-ho Song et al.

It is certified that error appears in the above-identified patent and that said Letters Patent is hereby corrected as shown below:

Column 12, Line 31, in Claim 9, after "summing" insert --a--.

Signed and Sealed this
Eleventh Day of January, 2011

David J. Kappos
*Director of the United States Patent and Trademark Office*